United States Patent [19]

Du et al.

[11] Patent Number: 5,148,443
[45] Date of Patent: Sep. 15, 1992

[54] LASER

[75] Inventors: Keming Du; Peter Loosen, both of Aachen; Gerd Herziger, Roetgen-Rott, all of Fed. Rep. of Germany

[73] Assignee: Fraunhofer-Gesellschaft zur Forderung der Angewandten Forschung e.V., Fed. Rep. of Germany

[21] Appl. No.: 601,757

[22] PCT Filed: Apr. 21, 1989

[86] PCT No.: PCT/DE89/00250
§ 371 Date: Dec. 17, 1990
§ 102(e) Date: Dec. 17, 1990

[87] PCT Pub. No.: WO89/10642
PCT Pub. Date: Nov. 2, 1989

[30] Foreign Application Priority Data

Apr. 22, 1988 [DE] Fed. Rep. of Germany ....... 3813572

[51] Int. Cl.⁵ .............................................. H01S 3/081
[52] U.S. Cl. .......................................... 372/93; 372/92; 372/94; 372/99; 372/107
[58] Field of Search ................. 372/93, 94, 92, 99, 372/107

[56] References Cited

U.S. PATENT DOCUMENTS 4,433,418 2/1984 Smith ................................... 372/95
4,723,256 2/1988 Hoag .................................... 372/93

FOREIGN PATENT DOCUMENTS 0197848 10/1986 European Pat. Off. .
2422193 3/1974 Fed. Rep. of Germany .
2306550 4/1975 France .
0039393 3/1977 Japan .
0138974 10/1981 Japan .
2087136 5/1982 United Kingdom .
2190237 5/1986 United Kingdom .

Primary Examiner—Georgia Y. Epps
Attorney, Agent, or Firm—Evenson, Wands, Edwards, Lenahan & McKeown

[57] ABSTRACT

A laser has a beam path multiply folded by two resonator end mirrors and at least one reflector retroreflectively folding the laser beam. The laser axis is parallel displaced to the axis of a further reflector. In order to improve the laser beam quality while retaining its comparatively low adjustment sensitivity, the beam path is folded at least twice with the retroreflective reflector.

16 Claims, 7 Drawing Sheets

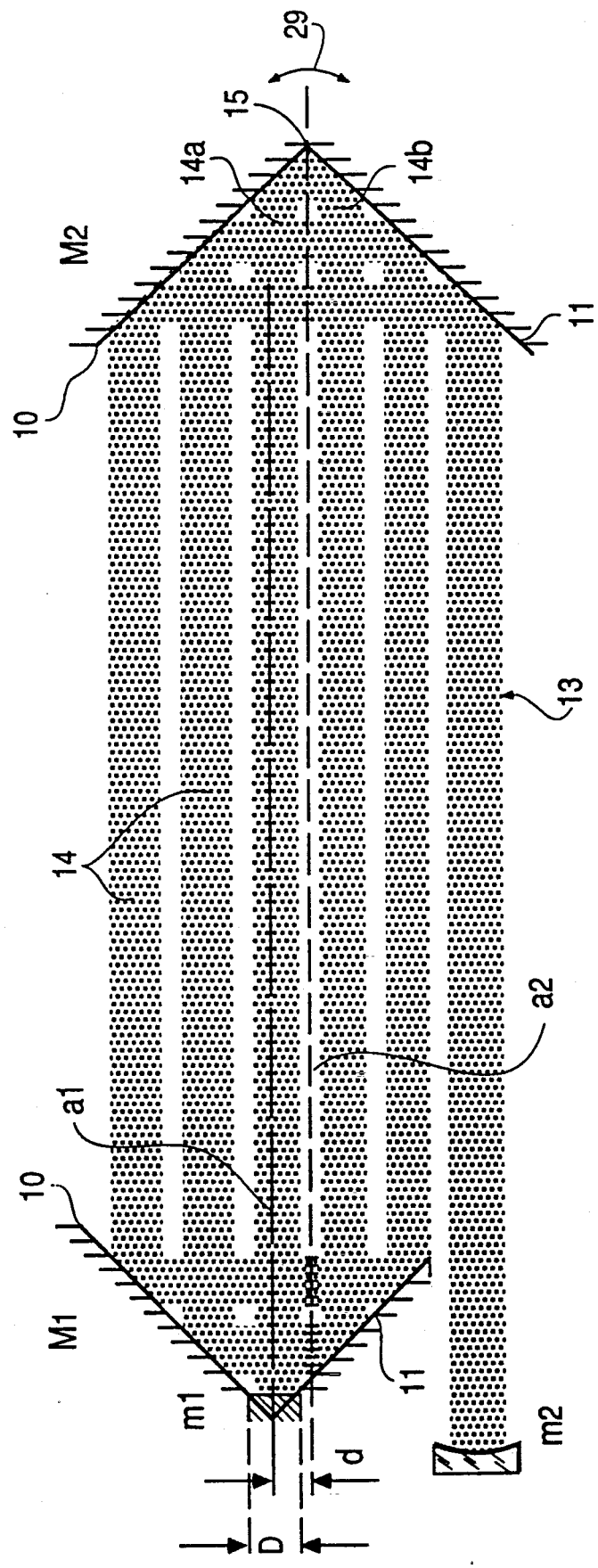

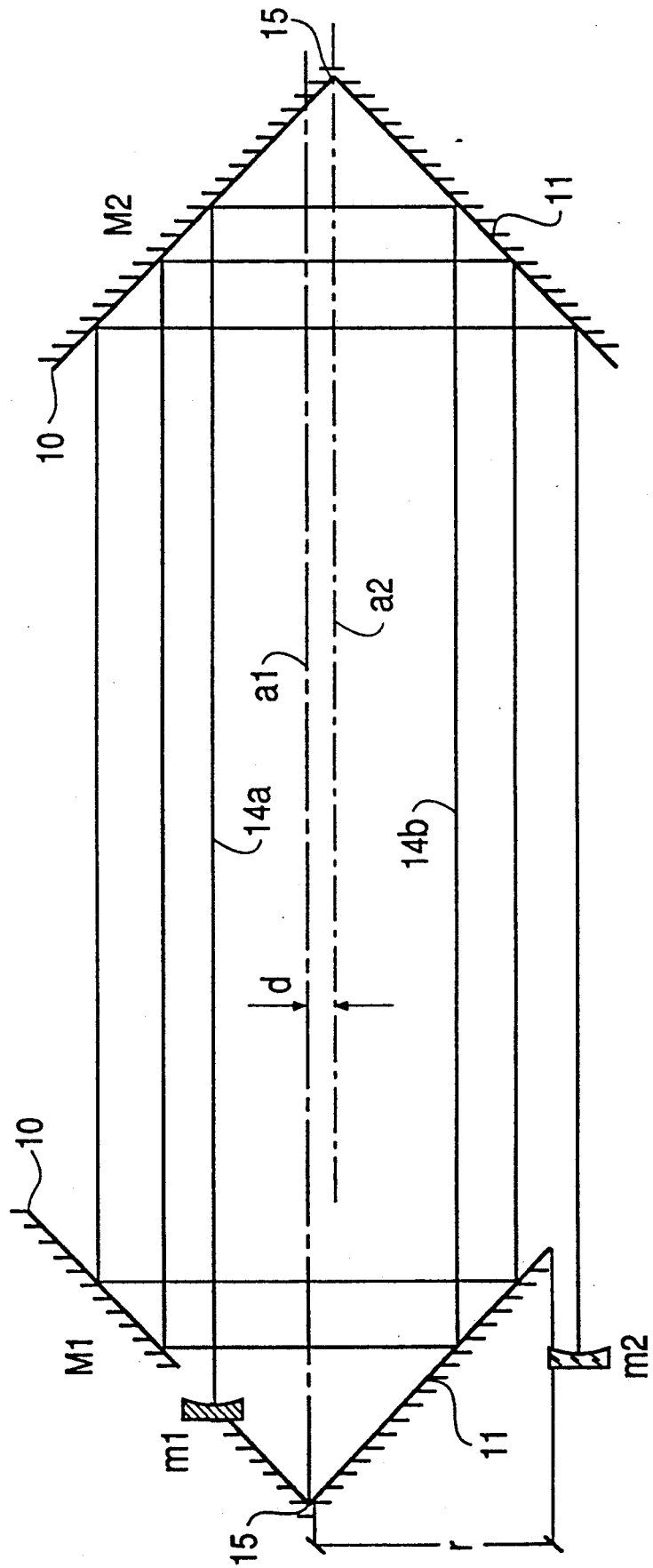

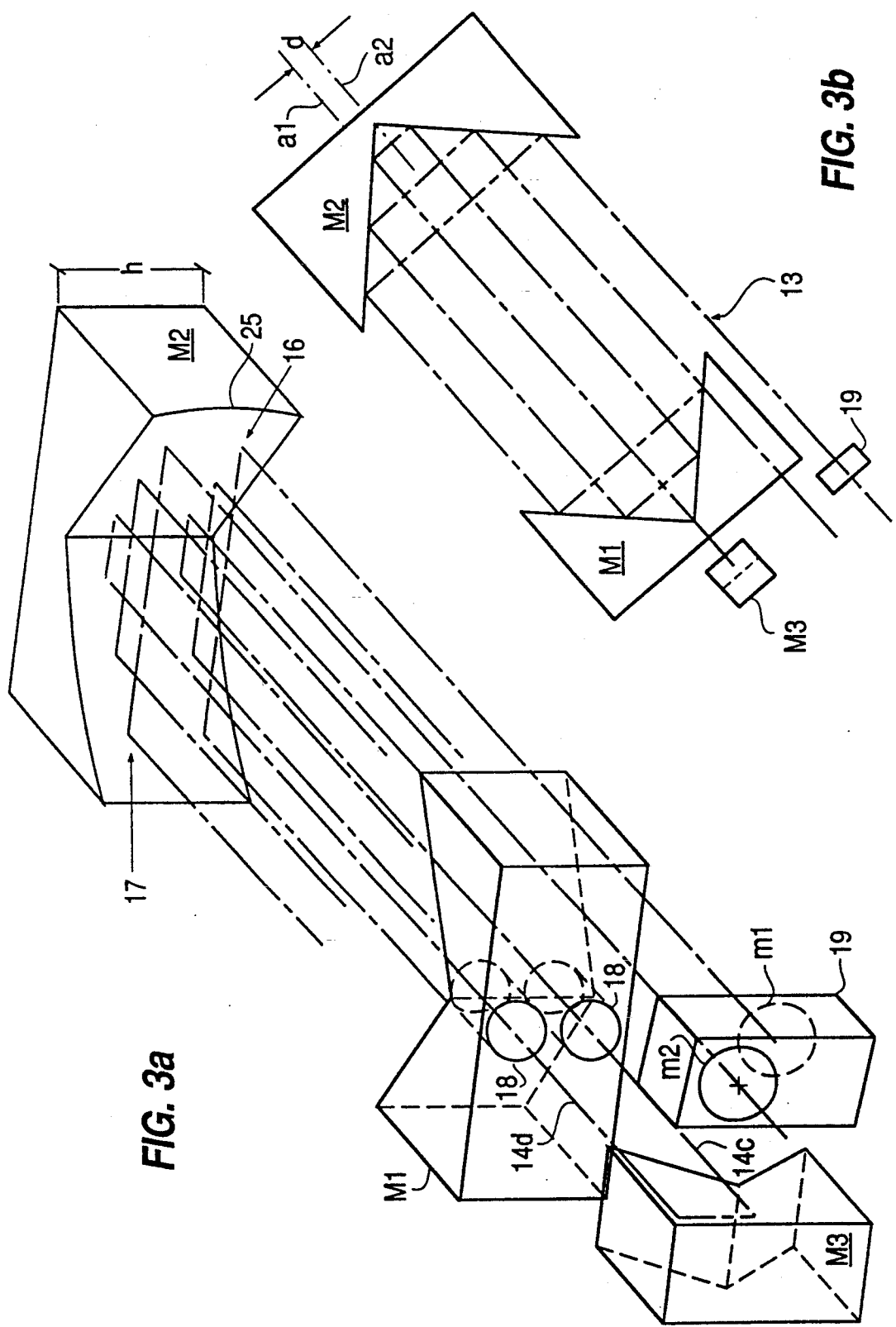

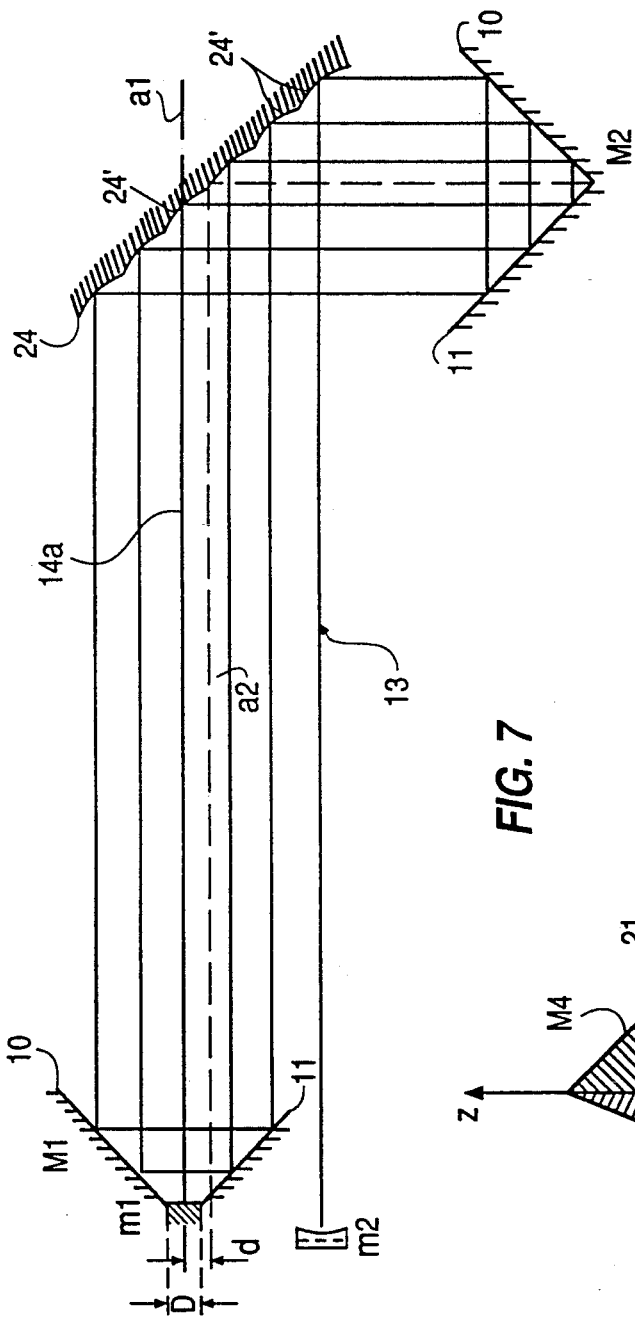

LASER

BACKGROUND AND SUMMARY OF THE INVENTION

The invention relates to a laser with a beam path multiply folded by means of two cavity resonator end mirrors and with at least one reflector retroreflectively folding the laser beam and whose axis is in particular laterally displaced with respect to the axis of a further reflector.

In the case of the conventional laser, a plurality of reflectors retroreflectively folding the laser beam is constructed as a roof mirror, and two such adjacent members are axially parallely displaced relative to one another in the folding plane by approximately half their total width or approximately by half a reflecting mirror width, so that the laser beam path reciprocates and can be progressively folded. Thus, these roof mirrors are components of a so-called multipass resonator, whose folding mirrors or reflectors are used for reducing the longitudinal extension of the laser. Folding generally leads to problems in the beam guidance and quality. The beam guidance is impaired in that the beam is not completely precisely reflected in the desired direction, because the mirror adjustment is not accurate or can be undesirably influenced by the laser design. The beam quality is impaired, for example, by diffraction effects during reflection in the corner regions of roof mirrors. Generally speaking, the disadvantages increase with the number of folding actions.

A general improvement with regards to the aforementioned disadvantages is obtained through the use of retroreflective mirrors including the aforementioned roof mirrors. Such retroreflective mirrors have the property of reflecting parallel to itself an incident beam independently of the angle of incidence, so that its adjustment sensitivity is comparatively small. Such retroreflective reactors act in one plane, such as e.g. the aforementioned roof mirrors, or three-dimensionally, i.e. if three reflecting surfaces are arranged at right angles to one another. Although the adjustment sensitivity of, for example, 10 millirad is significantly reduced compared with other, non-retroreflective reflectors of, pay, 100 microrad, the beam quality still needs improvement.

An object of the present invention is to so improve a laser such that, while maintaining a comparatively low adjustment sensitivity, it has an improved beam quality.

This object is achieved by the present invention in that the beam path is folded at least twice with the retroreflective reflector.

It is an important aspect of the present invention that the influence of optical inhomogeneities on the beam quality can at least partly be removed by the special folding geometry of the retroreflective reflectors. In addition, the adjustment sensitivity is further reduced with such reflectors. This is mainly achieved in that the retroreflective reflector is utilized several times for folding the beam path. Thus, there are no optical imprecisions between individual, independent reflectors. The adjustment errors of several individual retroreflective reflectors are avoided and the stability is increased. Optical inhomogeneities are, in particular, reduced compared with conventional multipass resonators, in that spatial superimposing of individual beam path portions can be avoided.

Advantageously, the offset of the reflectors is the same or greater than the radius of the laser beam and smaller than the radial extension of the reflector mirror. As a result of this dimensioning of the offset it is ensured that there is no reciprocal overlap of beam path portions. By avoiding overlaps of parallel beam path portions of the laser beam, the best possible beam quality is obtained. The laser beam remains in the folding area of the two reflectors. In addition, the laser beam does not have to radiate into the corner area of a reflector. Such corners of two or three-dimensional retro-reflective reflectors lead to pronounced diffraction effects because the corners of the reflectors cannot be made precisely at right angles. There are instead always rounding effects and unevennesses bringing about further resonator losses leading to a significant divergence angle of the radiation reflected by them and, at the same time, significantly impairing the beam quality. Moreover, the corner of the retroreflective reflector is generally exposed to a risk of damage, so that a beam guidance avoiding this corner generally avoids the risk of any deterioration of the laser illumination.

The retroreflective reflector acts in a two-dimensional manner, and the offset occurs in the folding plane. As a result of this construction of the laser or its resonator arrangement, it is possible to achieve a favorable utilization of the active laser material in one plane. An optimum utilization of the active material in space or in three directions diverging from one another is achieved by the retroreflective reflector acting in a three-dimensional manner and by the offset being determined by a translatory displacement of the reflector adapted to the available active laser material cross-section. In both aforementioned cases, the above-described advantages are accompanied by an increased flexibility during the adaptation of the reflectors to the constructional circumstances of the laser through a corresponding choice of offset. In addition, the utilization of the active material is more effective, i.e. a performance improvement occurs as compared with conventional multipass resonators.

Advantageously there are two at least optically facing retroreflective reflectors, and each reflector folds the beam path at least twice. Such a construction is particularly advantageous for a simple construction of retroreflective reflectors acting in two or three-dimensional manner because there is then at least approximately equal folding and consequently reflectors of the same size are used.

In order to completely use the space between two retroreflective reflectors and to hold the active laser material with maximum compactness, the laser is constructed in such a way that a resonator end mirror is arranged equiaxially with a retroreflective reflector or axially parallel thereto in the sense of a spiral-shaped expansion of the beam path. It is appropriate for the resonator end mirror to be arranged in the corner area of the reflector which, as a result of the aforementioned disadvantages, should not in any case be incorporated into the beam path, so that a further improvement to the compactness of the laser construction is obtained.

It is also very important for obtaining a compact laser construction to use a space of the active laser material extending radially in all directions. In the case of planar or two-dimensionally acting retroreflective reflectors this can be achieved by two two-dimensionally acting reflectors allowing retroreflective folding in at least two beam path planes and at least one retroreflective reflector arranged in an edge manner with respect thereto and bringing about the transfer of the beam path between the two beam path planes. In order that the retroreflective reflectors can be used in an optimum manner for beam folding, the two resonator end mirrors are arranged laterally outside the beam path plane alongside one of the retroreflective reflectors and level with one of the beam path planes.

If there are two-dimensional retroreflectively acting reflectors and a translatory offset bringing about two parallel beam path planes, the number of separate reflecting components of the resonator arrangement having several beam path planes is further reduced. It is possible to eliminate one or more mirrors for passing the beam path between two beam path planes.

Since in particular in the case of a multiple folding of the beam path, the laser radiation or illumination does not always have negligible divergences or power losses, it is advantageous to fit in the beam path at least one intermediately focussing optics device. The construction of the optics device is matched to the beam guidance arrangement. Advantageously its construction is a parabolically acting mirror deflecting all the beam path portions, or a collecting lens extending over the entire cross-section taken up by the folded beam path. For reasons of easy manufacture, the parabolically acting mirror is more particularly used for a beam path folded in one or more planes, whereas preference is given to the collecting lens if the beam path is so constructed with respect to the cross-sectional plane that the production of parabolically acting mirrors is too complicated or leads to an inadequately accurate beam guidance and an unacceptably deteriorated beam quality.

While utilizing the aforementioned features, the laser of the present invention can, in particular, be so constructed that it permits a beam division. It is equipped in such a way that a resonator end mirror is arranged as a partly transmitting window within the folded beam path and that the end mirror is followed by at least one further partly transmitting output or outcoupling mirror. The laser illumination leaving the resonator is so guided between the retroreflecting reflectors outside the resonator area that part of the laser illumination is coupled out and the reflected portion is available at another point as a second beam. The beam division achieved in this way is in particular of interest because the illumination portion leaving the resonator is again passed by the retroreflective reflectors through active laser material and can consequently be amplified both before and after reaching the or one outcoupling mirror.

An advantageous construction is obtained if both resonator end mirrors are arranged equiaxially and at least one reflecting surface of one of the reflectors forms the output mirror. In this case, all the beam path portions formed by the reflectors are available for amplifying the complete laser illumination or part thereof and the beam quality and adjustment sensitivity are not impaired by an increased number of components.

According to another aspect of the invention, the laser has a dielectric material laser block having channels adapted to the active material in the beam diameter, and the retroreflective reflectors are positioned at a distance from the block or on correspondingly shaped end faces.

BRIEF DESCRIPTION OF THE DRAWINGS

These and further objects, features and advantages of the present invention will become more apparent from the following detailed description of currently preferred embodiments of the present invention when taken in conjunction with the accompanying drawings wherein:

FIGS. 1 and 2 are two schematic different beam paths folded between two embodiments of two-dimensional retroreflective mirrors.

FIG. 3a is a perspective schematic view of a resonator constructed with two beam path planes.

FIG. 3b is a plan view of the resonator of FIG. 3a for illustrating the beam guidance.

FIG. 6 is a view similar to FIG. 1 with an intermediately focussing optics arrangement.

FIG. 7 is a perspective schematic view of a three-dimensionally acting retroreflective reflector with an intermediately focussing parabolic mirror.

DETAILED DESCRIPTION OF THE DRAWINGS

Figure 4A:
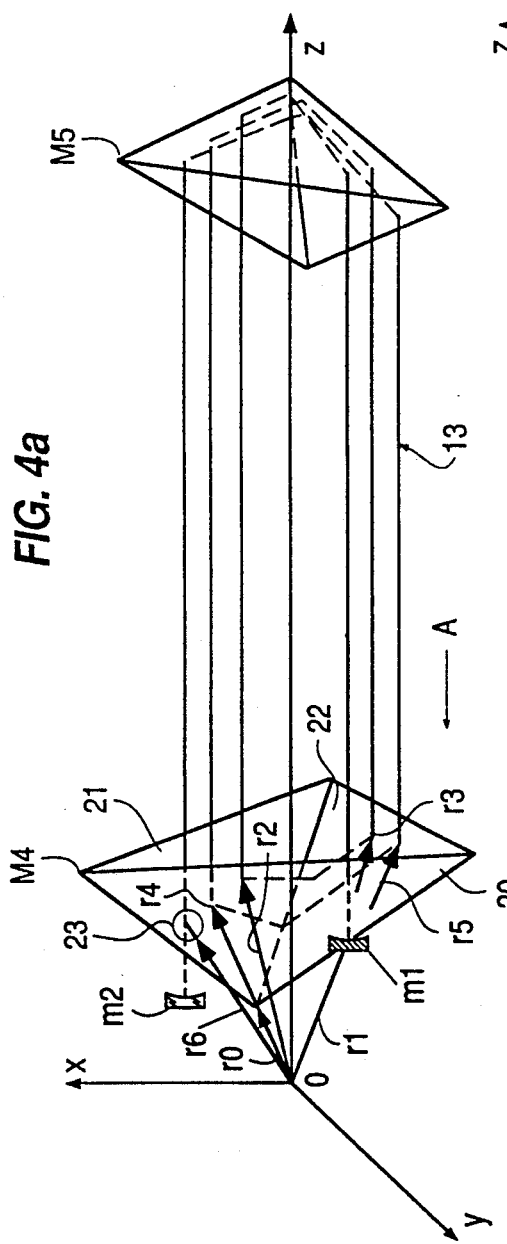
FIG. 4a is a perspective view of a resonator with two cubically acting retroreflective reflectors.

FIG. 1 shows two retroreflective reflectors M1 and M2 facing one another in the same plane. Each reflector M1, M2 has two reflecting surfaces 10, 11 arranged at right angles to one another and which enclose the axes a1, a2 as angle bisectors. These axes are offset axially parallel in the representation plane (i.e. the plane of the paper), the offset being d. The reflectors M1, M2 with two resonator end mirrors m1, m2 form a resonator arrangement, the laser beam 13 between the mirrors m1, m2 being multiply folded in the representation plane. The spatial spread or the diameter of the laser beam 13 is determined by the mirror m1, which is positioned in the corner area of the reflector M1. Consequently the laser beam 13 has the diameter D. With respect thereto the offset of the reflectors M1, M2 is such that d is the same or larger than D/2, i.e. the radius of the laser beam 13.

According to FIG. 1 the beam path of the laser beam 13 is multiply folded between the cavity resonator end mirrors m1, m2, the left-hand reflector M1 being folded twice and the right-hand reflector M2 thrice. This gives in all six parallel, juxtaposed beam path portions 14 in a single beam path plane, the parallelism of the portions 14 being relatively independent of whether the reflectors M1, M2 are slightly reciprocally turned in the representation plane in the direction of the double arrow 29. The reason is that the folding by the reflectors M1, M2 takes place retroreflectively, i.e. an incident beam path portion is reflected parallel to itself.

FIG. 1 also shows that the beam path portions 14 are relatively closely juxtaposed, so that there is a good utilization of the active laser material (not shown). The utilization is roughly equal over the entire cross-section available for laser illumination or radiation, because the resonator end mirror m1 is arranged equiaxially to the retroreflective reflector M1 and the offset d is only slightly larger than D/2. This oversize determines how far the two innermost beam path portions 14a, 14b are from the corner 15 of the reflector M2. This distance of the beam path portions 14a, 14b from the corner 15 or the reciprocal spacing of the beam path portions 14a, 14b must increase as the construction of the corner 15 becomes less homogeneous and as the beam quality decreases.

FIG. 2 is a view similar to FIG. 1, in which the distance between the adjacent inner beam path portions 14a, 14b is much larger than in FIG. 1. This embodiment can be used for those resonator arrangements in which the corners 15 of the reflectors M1, M2 are particularly inhomogeneous. This is the case, for example, if the reflectors M1, M2 are not in one piece, such as comprise one-piece roof mirrors and are instead constituted by separate reflecting surfaces which are kept at a certain distance from one another in their reciprocal right-angled arrangement, e.g. by a block-like component. In this case, not only the corner 15, but also the area surrounding the corner is unusable for reflecting the laser beam. Advantageously, the resonator end mirror m1 is not arranged equiaxially to the reflector M1, as in FIG. 1, but is displaced in axially parallel manner to the reflector M1.

In both the above-described resonator arrangements the association of the resonator end mirrors M1, M2 to the axes a1, a2 of the reflectors M1, M2 is such that there is a spiral-shaped expansion of the beam path. It is obvious that in both cases the offset d is smaller than the radial extension r of a reflector mirror, e.g. 11, because otherwise it is not possible to obtain a multiple folding by at least one reflector, e.g. M2.

FIGS. 3a and 3b show a laser with two retroreflective reflectors M1,M2, which are constructed as roof mirrors for two superimposed beam path planes 16,17. Correspondingly the height h of each reflector M1,M2 is at least equal to 2d. For passing the laser beam 13 between the two beam path planes 16,17, an on-edge retroreflective reflector M3 carries out the deflection of the laser beam 13 between the beam path portions 14c and 14d and is arranged equiaxially to the reflector M1 which in its corner area has two superimposed passage bores 18 for the laser beam 13.

Taking account of the offset d, the reflector M1 in FIG. 3b is somewhat narrower than the reflector M2, so that the laser beam 13 can pass to the resonator end mirrors m1,m2. The latter are superimposed on a carrier block 19, but are in each case level with the beam path planes 16,17. As in the embodiments of FIGS. 1 and 2, mirror m1 acts exclusively in a reflecting manner, and the mirror m2, like that in the previous embodiments, is a partly transmitting window, i.e. acts as the outcoupling or output mirror. The beam path of the laser radiation 13 therefore, starting from the mirror m1, passes in the beam path plane 16 spirally into the axis a1 of the reflector M1 and from there via the on edge reflector M3 into the beam path plane 17 and spirally widening to the end mirror m2 through which part of the laser radiation is coupled out.

Figure 5:
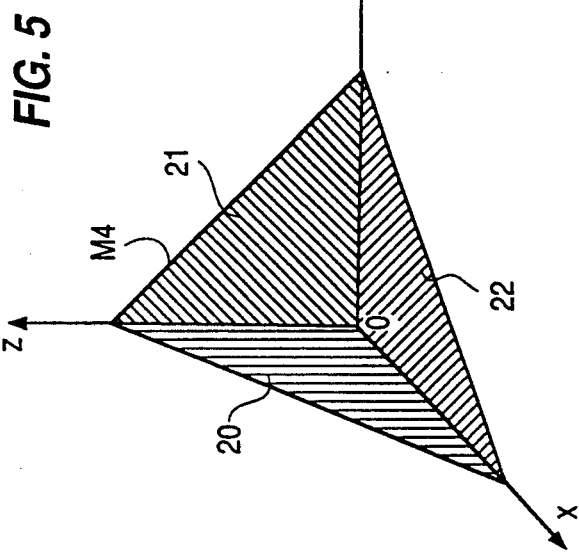
FIG. 5 is a perspective view of a single three-dimensionally acting retroreflective reflector.

The resonator arrangements shown in FIGS. 1 to 3b relate to retroreflective reflectors, which act in a two-dimensional manner. These are adjustment sensitive at right angles to the representation plane, so that when corresponding demands are made it is more advantageous to use three-dimensionally acting retroreflective reflectors. Such a reflector M4 is diagrammatically shown in FIG. 5. The reflector M4 comprises three mirrors 20,21,22 arranged at right angles to one another and which is also shown in FIG. 4a. Through such a cubically acting retroreflective reflector M4, the laser radiation is also reflected parallel to itself if the reflector is not only pivoted in the representation plane, but also and/or additionally in a direction at right angles to the reflector axis.

Figure 4B:
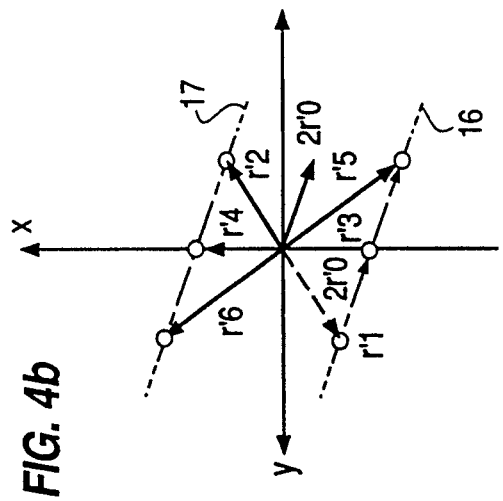
FIG. 4b shows beam distribution of the arrangement of FIG. 4a in direction A.

FIG. 4a shows a reflector arrangement whose reflectors M4,M5 are edge-parallel or rotation-free and consequently displaced in translatory manner about the vector r0. There are two folding planes 16,17 shown in FIG. 4b, in which are shown the projections r'0 and the projections of the position vectors r2 to r5 of the deflection points of the path of the laser beam 13 on the reflector mirrors 20,21,22 and the projections of the position vectors r1,r6 for the resonator end mirrors m1,m2 or the passage openings of the mirror 20 aligned therewith, only one passage opening 23 being shown in FIG. 4a. The offset of the reflectors M4,M5 is obtained from the projection r'0.

FIG. 6 shows an arrangement of the reflectors M1,M2 and the resonator end mirrors m1,m2 similar to FIG. 1, but a parabolically acting mirror 24 is located in the path of the laser beam 13. The arrangement is such that there is a deflection by 90° of the complete beam path. The mirror 24 is an intermediately focussing optics device and it comprises several mirror parts 24', in each case forming a parabolic mirror and which are so matched to the beam path that with each beam path portion, e.g. 14a, is associated a mirror part 24' and exerts the intermediate focussing action.

The deflection of the complete beam path by 90° in the manner visible from FIG. 6 may be undesired if the spatial superimposing of the beam path portions caused by the deflection takes place in the active material. In such a case a collecting lens would be more advantageous than the mirror 24 and the arrangement of the reflectors according to FIG. 1.

FIG. 7 shows a retroreflective reflector M4 with three reflector mirrors 20 to 22 at right angles to one another, but the mirror 20 has a parabolic construction. Thus, there is an intermediate focussing by the mirror 20 in the case of the three-dimensionally acting reflector M4. As the mirror 20 can only carry out the focussing with respect to one plane, it may also be advantageous to make the mirrors 21 and 22 parabolic.

FIG. 7 relates to the construction of one or more reflector mirrors 20 to 22 of the spatially acting reflector M4 as intermediately focussing optics. Intermediate focussing by the reflector is also possible with two-dimensionally acting reflectors. This is shown in FIG. 3a by a correspondingly curved edge line 25 on the reflector M2.

In place of the resonator end mirror m1 or m2, it is also possible to use a scraper mirror with convexly curved end mirrors matched to the hole or pinhole size of the scraper mirror, in order to create a multipass resonator with an unstable configuration, which is particularly designed for a high-performance laser. The multiple folding of the beam path leads to a correspondingly large amplification or gain in the case of a very compact laser construction and the previously described advantages of low adjustment sensitivity and high beam quality. However, it is also possible to construct the above-described resonator configurations in a stable manner. The multiple folding with closely juxtaposed beam path portions then brings about the desired high utilization of the active laser material, even in the case of low modes or small beam cross-sections.

Figure 8:
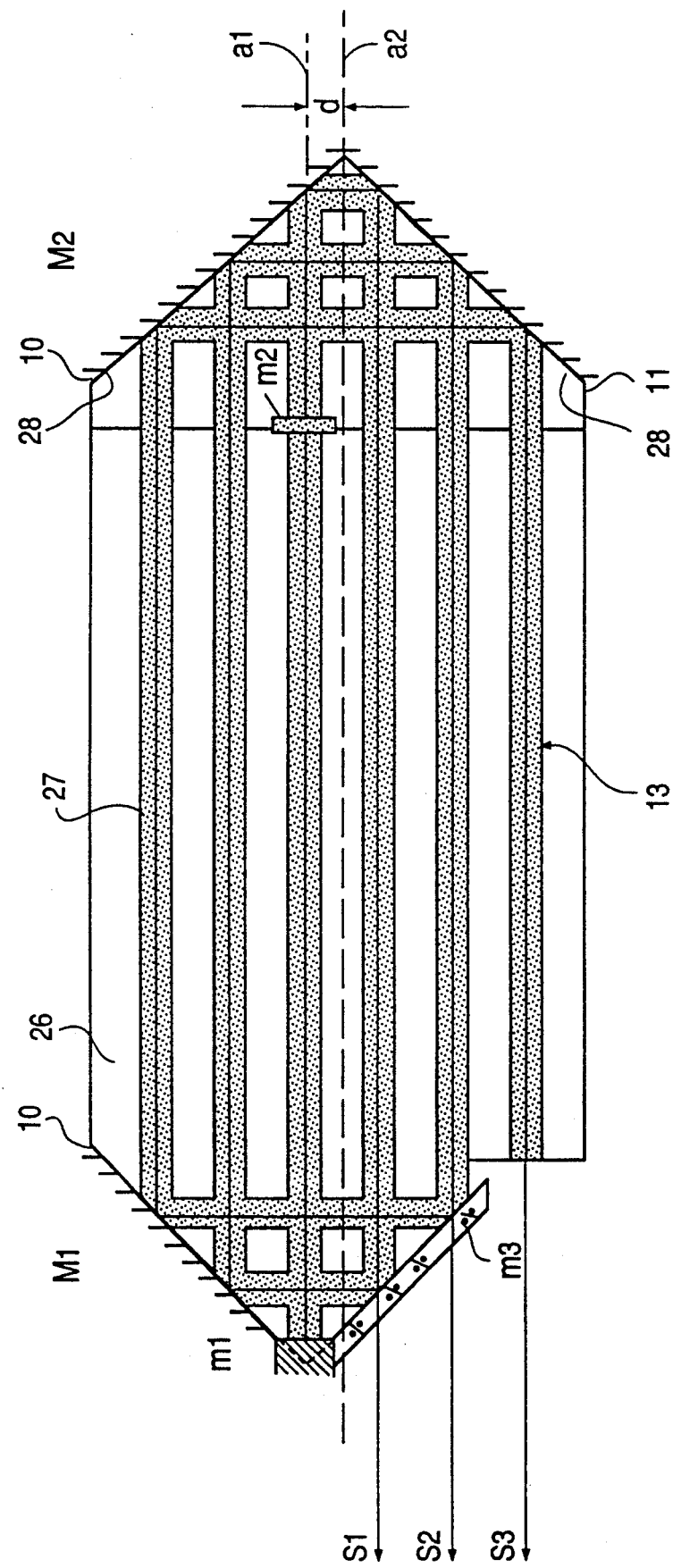
FIGS. 8 and 9 are further embodiments of lasers with multiply coupled out laser illumination or radiation.
Figure 9:
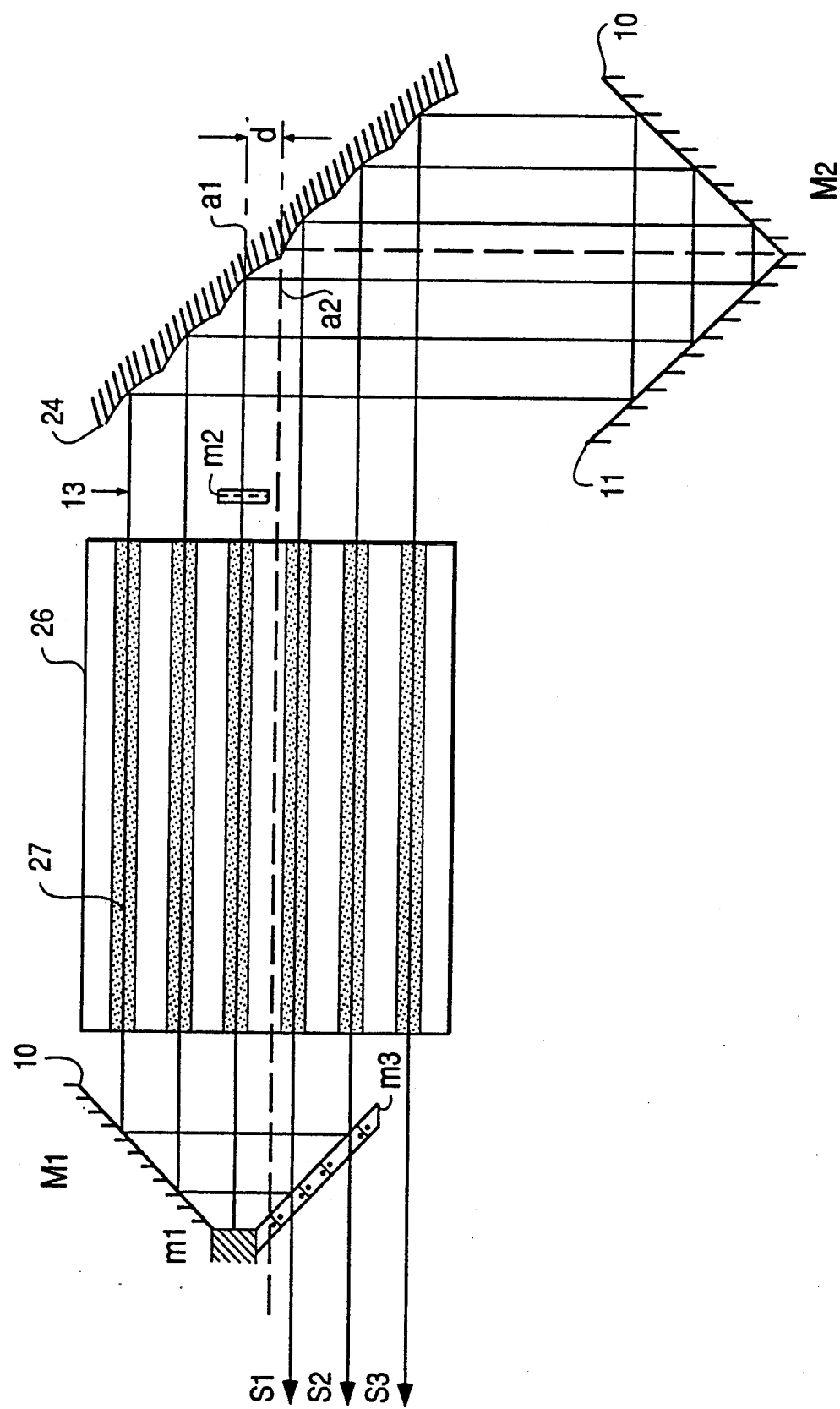

The multiple folding of the present invention has particular significance in the case where, according to FIGS. 7, 8 and 9, a resonator end mirror m2 is arranged within the folded path of the laser beam 13. FIGS. 8 and 9 show equiaxially arranged resonator end mirrors m1,m2. The mirror m2 is partially transmitting so that the laser radiation or illumination leaving it is determined in its basic characteristics by the relationships between the mirrors m1,m2. The resonator can, for example, be set with a mode diaphragm (not shown) to the predominant mode operation. The radiation leaving the partially transmitting resonator end mirror m2 is then folded or deflected in the previously described manner by the retroreflective reflectors M1,M2 and optionally an intermediately focussing optics device 24 and is amplified on passing through active material.

The special feature of the two embodiments of FIGS. 8 and 9 is that the resonator end mirror m2 is followed in the beam path by an out-coupling or output mirror m3. Consequently, part of the laser beam leaves the system and forms a first external laser beam S1. The output mirror m3 replaces the solely reflecting, non-partially transmitting mirror 11 of the retroreflective reflector M1 of FIG. 1. Thus, there is a spiral guidance of the beam path corresponding to FIGS. 1 and 2, where on each occasion when the laser beam again strikes the mirror m3, a further external laser beam is produced, e.g. S2 until the laser beam 13 leaves the reflector system and forms the external beam S3. This makes it possible to obtain a beam division, where use is also made of the advantages of the previously described embodiments. It is particularly advantageous in this beam division, that there is a amplification after each division, so that external beams are available with correspondingly adapted power levels. For example the power or performance adaptation can take place in such a way that all the beams have the same power. A predominant mode operation is then e.g. possible, so that the external laser beams S1 to S3 can be e.g. used as parallel-guided cutting beams, e.g. in cutting through sheet metal.

In FIG. 8 a laser block 26 made from dielectric material, e.g. ceramic, is positioned between the reflectors M1,M2. It contains channels 27 which take up the active material, e.g. gas. The laser block 26 has end faces 28 at an angle to one another, to which is applied the retroreflective reflector M1 or M2, which gives a correspondingly compact and stable laser design.

In accordance with the beam path, the channels 27 are parallel and at right angles to one another, which gives a corresponding spatial superimposing of the beam paths. This can lead to an unacceptable deterioration of the beam quality. In this case, spatial superimposing must take place outside the active laser material, as shown in FIG. 9, where the laser block 26 is arranged in such a way that the retroreflecting reflectors M1,M2 or the intermediately focussing mirror 24 are spaced therefrom.

In connection with the cavity resonator end mirrors m1,m2, it is apparent that in all the embodiments either partially transmitting or fully reflecting mirrors can be used. Whereas the former are conventionally used for forming stable resonators, the latter are used for the construction of unstable resonators. The aforementioned folding concepts can be used for both fundamental resonator configurations. It is also possible to replace the resonator end mirrors m1,m2 by non-light blocking windows. There is then an amplifier or oscillator, which is used for amplifying the coherent light radiated into it. Such an amplifier can be used in conjunction with lasers, which in turn have an independent, laser light-generating resonator system. Here again, the previously described folding concepts serve to improve laser systems in accordance with the set problem.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Laser with a laser beam path multiply folded by two cavity resonator end mirrors associated with at least one reflector configured for retroreflectively folding the laser beam and whose axis is displaced parallel to the axis of a second reflector, wherein the beam path is caused to be folded at least twice by the retroreflective reflector to form parallel beam paths in at least two-dimensions.

2. Laser according to claim 1, wherein the reflectors are offset, with the offset of the reflectors being at least equal to the radius of the laser beam and smaller than the radial extension of the reflector mirror.

3. Laser according to claim 2, wherein the retroreflective reflector reflects two-dimensionally, and the offset is in the folding plane.

4. Laser according to claim 2, wherein the retroreflective reflector reflects three-dimensionally, and the offset is determined by a translatory displacement of said reflector sized to the available cross-section of the active laser material.

5. Laser according to claim 1, wherein two at least optically facing retroreflective reflectors are provided, and each reflector folds the beam path at least twice.

6. Laser according to claim 1, wherein one resonator end mirror is arranged with a retroreflective reflector one of equi-axially and axially parallel thereto in the sense of a spiral-shaped expansion of the beam path.

7. Laser according to claim 6, wherein the resonator end mirror is located in a corner area of the reflector.

8. Laser according to claim 1, wherein at least two-dimensionally acting reflectors retroreflectively fold the laser beam in at least two beam path planes and at least one retroreflective reflector is arranged in an on-edge manner thereto to part the beam path between the two beam path planes.

9. Laser according to claim 8, wherein the two resonator end mirrors are positioned laterally outside the beam path planes alongside one of the retroreflective reflectors and level with a respective one of the beam path planes.

10. Laser according to claim 5, wherein two three-dimensionally retroreflectively acting reflectors and are provided having a translatory offset bringing about two parallel beam path planes.

11. Laser according to claim 1, wherein at least one intermediately focussing optics is located in the beam path.

12. Laser according to claim 11, wherein the intermediately focussing optics is one of a parabolically acting mirror deflecting all the beam path portions and a collecting lens extending over the entire cross-section taken up by the folded beam path.

13. Laser according to claim 1, wherein one resonator end mirror is arranged as a partially transmitting window within the folded beam path, and said resonator end mirror is followed by at least one further partially transmitting out-coupling mirror.

14. Laser according to claim 13, wherein both resonator end mirrors are arranged equiaxially, and at least one face of one of the reflectors forms the out-coupling mirror.

15. Laser according to claim 1, wherein a dielectric material laser block having channels adapted to the active material in the beam diameter is provided in the laser, and the retroreflective reflectors are one of spaced from the block and located on correspondingly shaped end faces.

16. Laser according to claim 1, wherein non light-block windows are provided in place of the resonator end mirror.

* * * * *